US007353643B2

(12) United States Patent
Cirio (10) Patent No.: US 7,353,643 B2
(45) Date of Patent: Apr. 8, 2008

(54) SYSTEM FOR FEEDING CAPS WITH ROTATING-DRUM ACCUMULATION DEVICE

(75) Inventor: Sergio Cirio, Canelli (IT)

(73) Assignee: Arol SpA, Canelli (Asti) (IT)

( * ) Notice: Subject to any disclaimer, the term of this patent is extended or adjusted under 35 U.S.C. 154(b) by 0 days.

(21) Appl. No.: 11/530,731

(22) Filed: Sep. 11, 2006

(65) Prior Publication Data
US 2007/0157552 A1 Jul. 12, 2007

(30) Foreign Application Priority Data
Dec. 23, 2005 (IT) .......................... TO2005A0904

(51) Int. Cl.
*B65B 7/28* (2006.01)
(52) U.S. Cl. .......................... 53/290; 53/309
(58) Field of Classification Search .................. 53/290, 53/305, 306, 307, 309, 311, 367
See application file for complete search history.

(56) References Cited

U.S. PATENT DOCUMENTS

| 553,758 | A | * | 1/1896 | Lipphardt et al. ............. 53/311 |
| 1,060,948 | A | * | 5/1913 | Schuster ...................... 53/306 |
| 1,958,769 | A | * | 5/1934 | Rundell ....................... 53/290 |
| 2,325,163 | A | | 7/1943 | Goodwin et al. |
| 2,729,377 | A | * | 1/1956 | O'Neil ........................ 53/306 |
| 4,277,928 | A | * | 7/1981 | Ahlers ........................... 53/67 |
| 4,558,802 | A | * | 12/1985 | Molison ...................... 221/11 |
| 5,309,696 | A | * | 5/1994 | Heudecker et al. .......... 53/306 |

FOREIGN PATENT DOCUMENTS

| DE | 1 481 166 | 8/1970 |
| GB | 933 881 | 8/1963 |
| NL | 1002841 | 10/1997 |

OTHER PUBLICATIONS

Partial EP Search Report, Application No. 06115951.3, dated Apr. 5, 2007.

* cited by examiner

*Primary Examiner*—Louis Huynh
(74) *Attorney, Agent, or Firm*—Patterson & Sheridan, LLP (57) ABSTRACT

System for feeding bottle-tops to a bottle closing machine, in particular for feeding caps to an automatic capping machine, comprising an accumulation device, an entrance channel for feeding caps to the accumulation device and an exit channel to discharge the caps from the accumulation device and feed the caps to the capping machine. The accumulation device comprises a drum rotating around a vertical axis and provided with a plurality of pipes distanced uniformly one from another in the circumferential direction and each having an upper extremity and a lower extremity respectively for the entrance and exit of the caps.

8 Claims, 7 Drawing Sheets

SYSTEM FOR FEEDING CAPS WITH ROTATING-DRUM ACCUMULATION DEVICE

CROSS-REFERENCE TO RELATED APPLICATIONS

This application claims benefit of Italian Patent Application Number TO2005A000904, filed Dec. 23, 2005, which is herein incorporated by reference.

BACKGROUND OF THE INVENTION

1. Field of the Invention

The present invention relates to a system for feeding bottle-tops to a bottle closing machine, in particular for feeding caps to a capping machine, comprising an accumulation device located on a cap feeding pathway.

The present invention was developed in particular in view of its application to automatic plants for forming plastic bottles, filling and capping the bottles using plastic caps.

In plants of this type an accumulation device for the caps is normally provided for on the cap feeding pathway. The accumulation device has a minimum capacity such as to ensure that all containers present in the bottle forming, filling and capping stations can be capped even should the supply of caps be temporarily interrupted.

2. Description of the Related Art

The document EP-B1-0993417 describes a plant for filling and capping bottles provided with a mobile buffer stock device for the caps capable of moving the caps at a predetermined rate along a feeding pathway. The mobile buffer stock device described in that document comprises an inner drum that rotates around a vertical axis provided around its periphery with a plurality of housings that engage respective caps and an external helicoidal runway along which the caps are made to advance at a predetermined rate.

In the solution described in document EP-B1-0993417, the caps advance in a continuous fashion along the feeding route at a rate and an instantaneous velocity that depends on the work rhythm of the capping machine, so that the accumulation device must be designed and produced for a specific capping machine and cannot be used with capping machines having different characteristics. In the known solution, the caps must fill each housing of the accumulation device since any discontinuities would cause operating problems, such as for example the failure to close all containers. A further drawback of the known solution consists in the fact that each cap must cover the entire helicoidal or spiral pathway of the accumulation device, which entails a high risk that the accumulation device produces dust due to abrasion of the caps, and causes unnecessary stress on the caps.

SUMMARY OF THE INVENTION

The present invention aims to provide an accumulation device for a capping machine that enables the drawbacks of the known technique to be overcome.

According to the present invention, this goal is achieved by a cap feeding system having the characteristics subject of claim 1.

BRIEF DESCRIPTION OF THE DRAWINGS

The present invention will now be described in detail with reference to the attached drawings, given as a simple example without limiting intent, in which.

DETAILED DESCRIPTION

Figure 1:
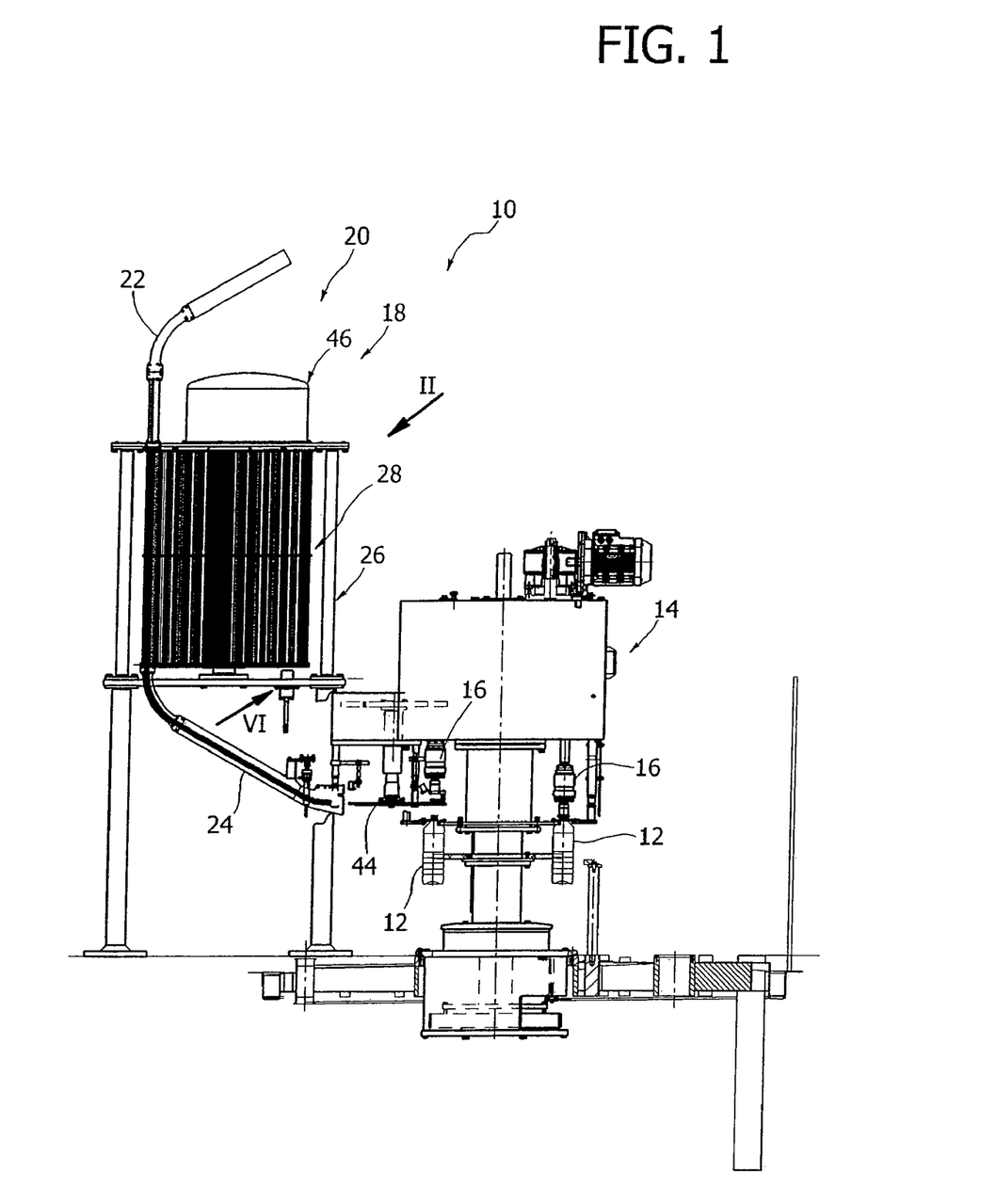
FIG. 1 is a side view in diagram form of a feeding system according to the present invention associated to a capping machine.

With reference to FIG. 1, an automatic plant for closing bottles 12 with plastic screw caps is indicated as 10. The plant 10 comprises a capping machine 14 having a turntable structure with a plurality of capping heads 16. The structure and operation of the machine 14 are known and thus their description lies outside the scope of the present invention.

The plant 10 comprises a cap feeding system 18 that feeds a continuous flow of caps to the capping machine 14. The cap feeding system 18 comprises an accumulation device 20 lying along a cap feeding pathway that comprises an entrance channel 22 and an exit channel 24, both stationary.

Figure 2:
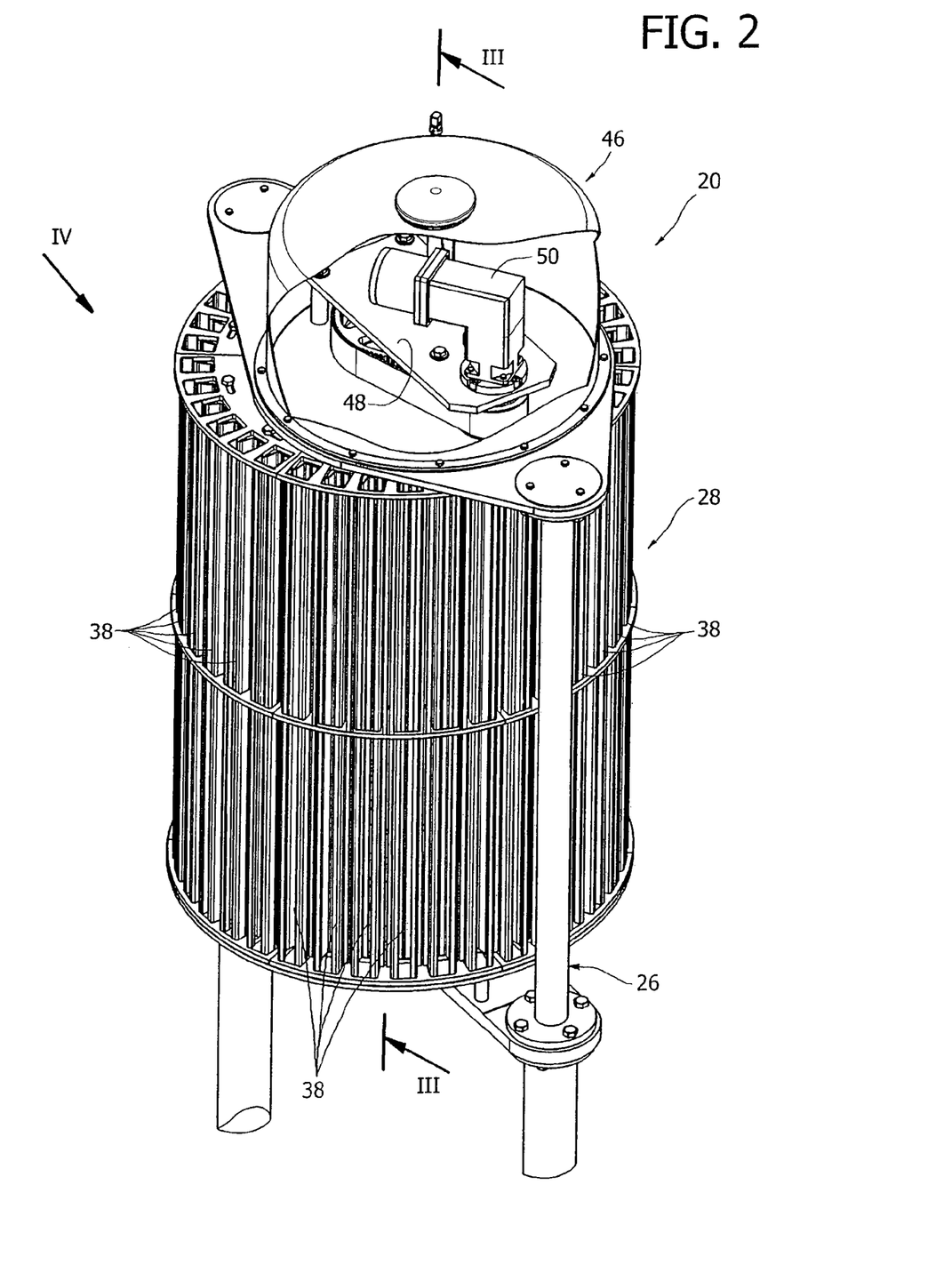
FIG. 2 is a perspective view of the accumulation device indicated by arrow II in FIG. 1.
Figures 3, 3A:
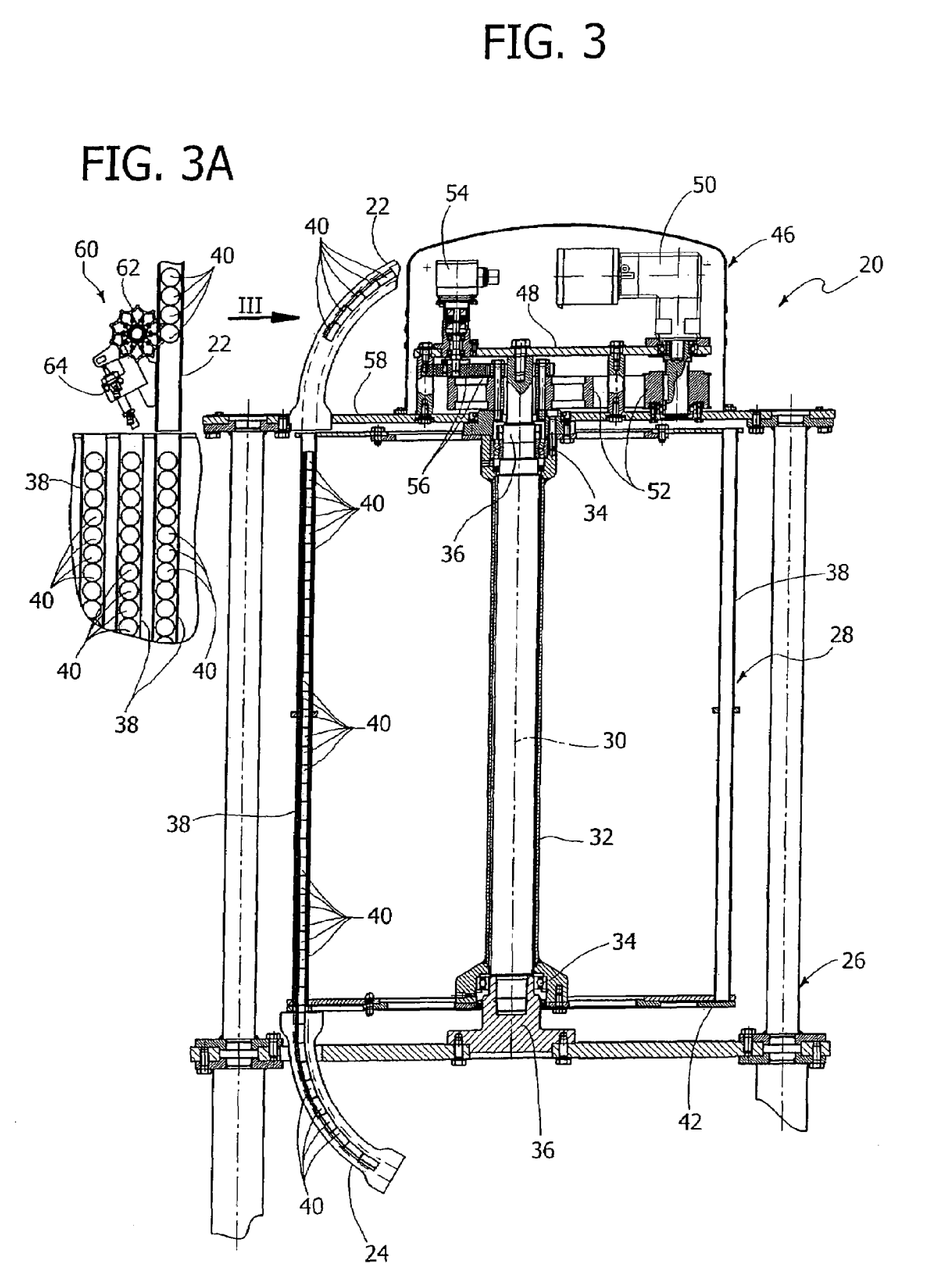
FIG. 3 is a section along the line III-III of FIG. 2.
FIG. 3a is a view of the part indicated by arrow III in FIG. 3.

With reference to FIGS. 2 and 3, the accumulation device 20 comprises a stationary structure 26 bearing a drum 28 rotating around a vertical axis 30. The drum 28 comprises a central shaft 32 that is supported such that it can rotate around an axis 30 on a stationary support 36 by means of bearings 34. The drum 28 comprises a plurality of peripheral pipes 38 equidistant one from the next in the circumferential direction and fixed with respect to the central shaft 32. Each pipe 38 has an upper extremity and a lower extremity, respectively for the entrance and exit of caps 40. Each pipe 38 forms a channel oriented vertically capable of receiving a pile of caps 40 (FIG. 3) disposed in contact one with the next.

With reference to FIG. 3, the lower extremities of the pipes 38 face onto a stationary plate 42 that stops the caps 40 contained in the pipes 38 from coming out.

The plate 42 has an opening that communicates with the upper extremity of the exit channel 24. The drum 38 may be rotated stepwise so as to bring the pipes 38 successively into correspondence with the exit channel 24. When a pipe 38 full of caps 40 comes into correspondence with the exit channel 24, the caps 40 slide down due to gravity into the top of channel 24 that runs from there downwards. To facilitate the movement of the caps 40 down the exit channel 24 means may be provided to generate air jets (not shown). As is illustrated in FIG. 1, a cap take-up device 44, of known structure and operation, is positioned to take up the caps 40 as they leave the lower end of the channel 24.

In FIG. 3 a drive mechanism to control rotation of the drum 28 around the vertical axis 30 is indicated with 46. The drive mechanism 46, optional, comprises a stationary supporting plate 48 bearing a motor reducer unit 50 that causes the shaft 32 to rotate through two pulleys 52 connected by a toothed belt. This transmission may be direct or alternatively may be achieved through a pair of gears. The drive mechanism 46 comprises an encoder 54 that detects the angular position of the drum 28. In the example illustrated, the encoder 54 is connected to the shaft 32 by means of two gears 56.

The entrance channel 22 is positioned such as to feed the caps 40 to the pipe 38 that at a given moment is positioned in correspondence to the entrance channel 22. The caps 40 move due to gravity down the entrance channel 22. Optionally, an air jet may be provided that facilitates the movement of the caps 40 down the entrance channel 22.

The entrance channel 22 terminates on a plate 58 which is part of the stationary supporting structure 26. The plate 58 bears the drive mechanism 46 and the support 36 upon which the upper extremity of the shaft 32 is mounted such that it can rotate.

As may be seen in FIG. 3, the lower extremity of the entrance channel 22 faces onto the upper extremity of one of the various pipes 38.

With reference to FIG. 3a, to avoid a cap remaining engaged contemporaneously in the channel 2 and in a pipe 38, a holding device 60 is situated in the vicinity of the lower extremity of the entrance channel 22. The holding device 60 comprises a wheel 62 with star-shaped profile that is free to rotate around a horizontal axis and is positioned such that the caps 40 moving down the entrance channel 22 cause the wheel 62 to rotate by effect of their interaction with the star-shaped profile of the wheel 62. The wheel 62 is associated with a locking element 64, comprising for example a pneumatic actuator, capable of selectively blocking the wheel 62. When the locking element 64 is activated, movement of the caps 40 down the entrance channel 22 upstream of the holding device 60 is interrupted. This holding device may alternatively be constructed with a component that makes a linear movement or a rotation through levers, with mechanical, pneumatic or magnetic control.

Should the length of the pipe 38 be a multiple of the diameter of the caps 40, such that the risk of jamming is avoided, the interruption device 60 may be superfluous.

Figure 4:
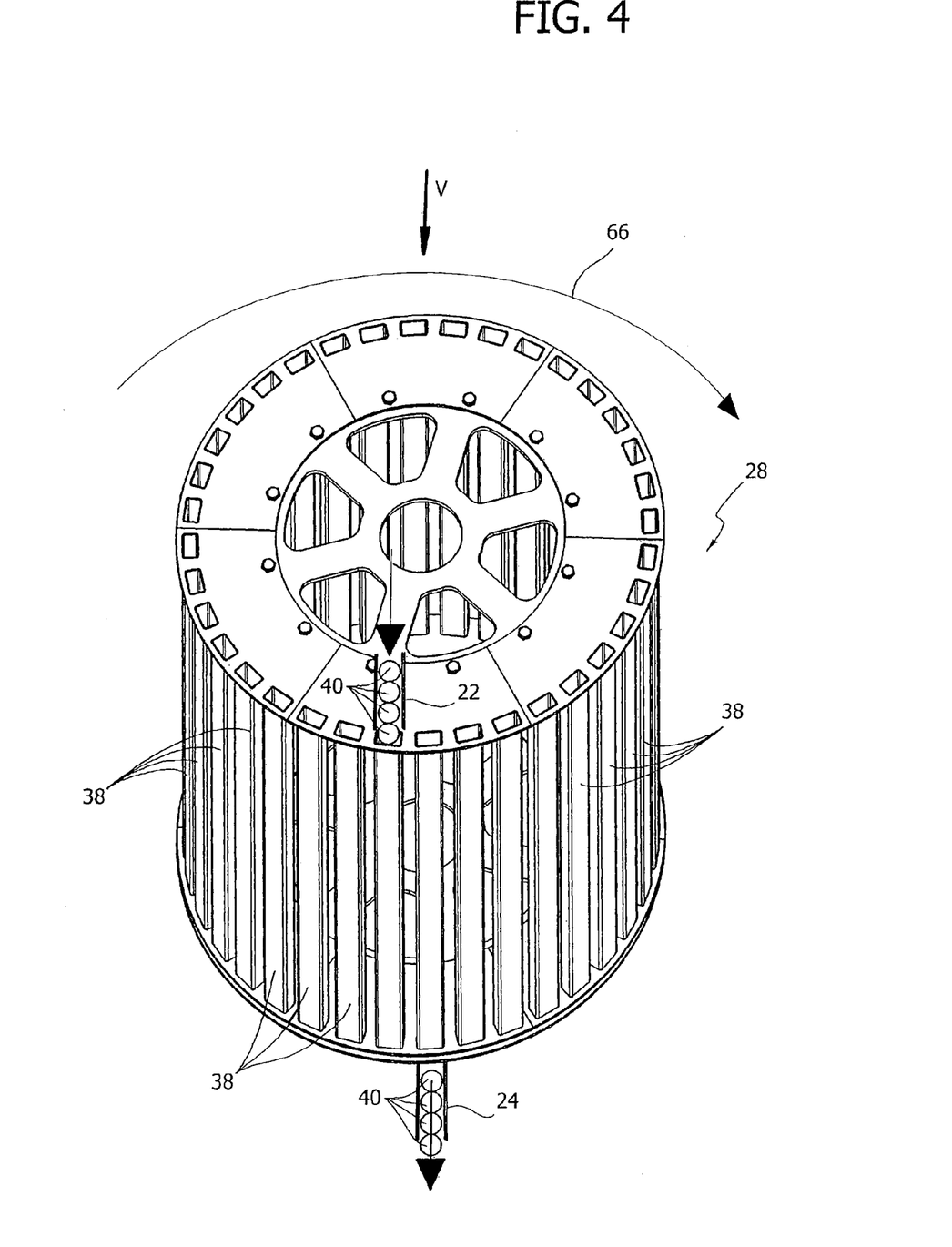
FIG. 4 is a perspective view of the part indicated by arrow IV in FIG. 2.
Figure 5:
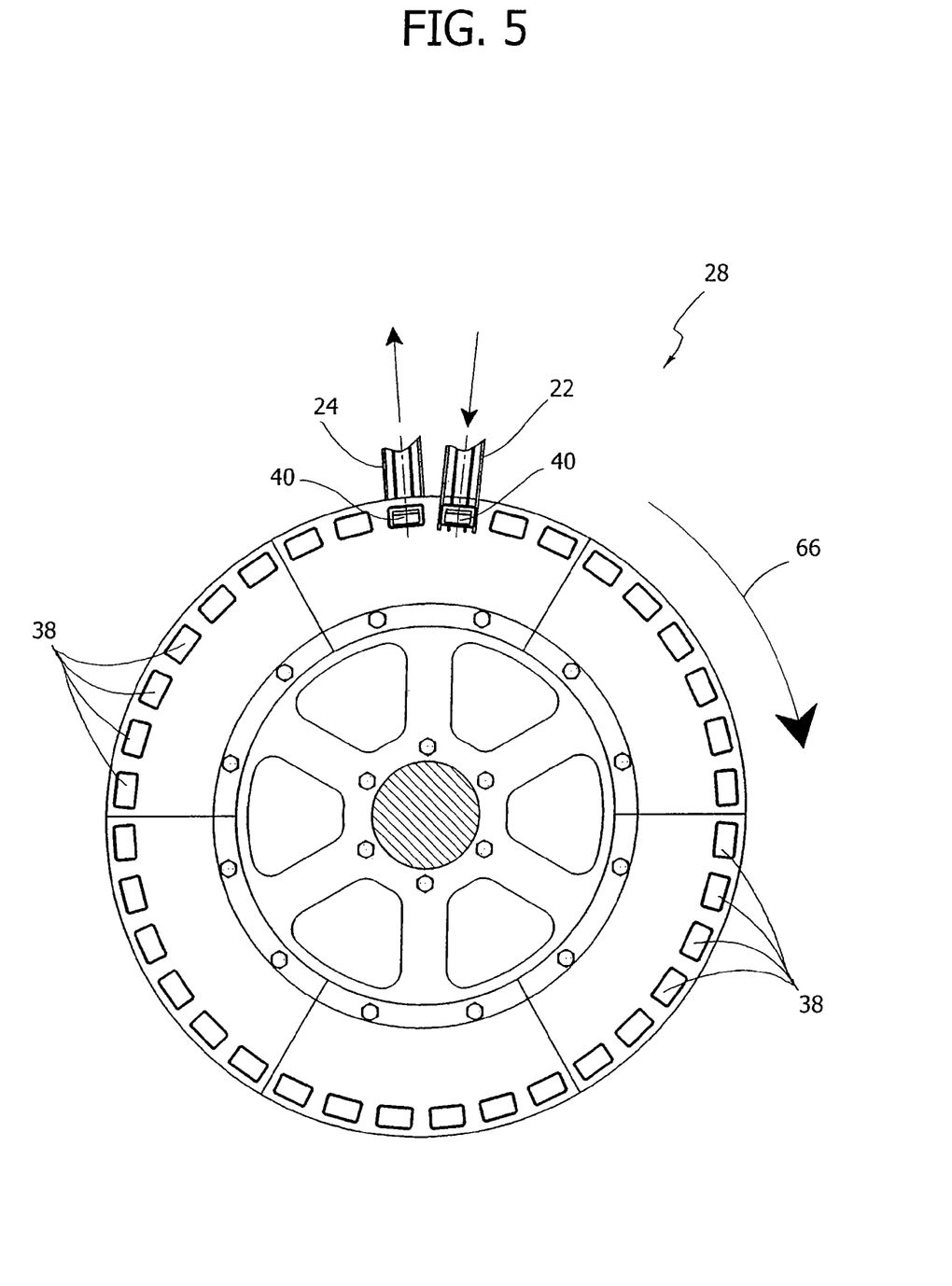
FIG. 5 is a plan view from the standpoint of arrow V in FIG. 4.

With reference to FIGS. 4 and 5, the entrance channel 22 and the exit channel 24 are out of phase one with the other in the circumferential direction by an angle corresponding to the angular distance between the pipes 38 of the drum 28, or a multiple of this. In the latter case, the fact that they are further out of phase implies that the size of the accumulation device is below the maximum possible size. The entrance channel 22 is displaced with respect to the exit channel 24 in the direction of rotation of the drum 28, indicated by arrows 66. The entrance channel 22 comes into communication with the upper extremity of the pipe 38 immediately successive to or close to the pipe 38 whose lower extremity is in communication with the exit channel 24, with reference to the direction of rotation 66 of the drum 28.

The drum 28 is associated with a first detection mechanism able to detect the condition in which the pipe 38 situated in correspondence with the entrance channel 22 is completely full of caps 40. A second detection mechanism is also provided for that detects the condition in which the pipe 38 situated in correspondence with the exit channel 24 is completely empty. In both cases, detection may be achieved for example by means of a counter associated with the wheel 62 of the interruption device 60, which counts the caps as they are fed into each pipe 38. A similar counter may be located in correspondence with the exit channel 24. Alternatively, a first photoelectric cell may be located at the upper extremity of the pipe 38 that, at a given moment, is situated in correspondence with the entrance channel 22 and a second photoelectric cell may be located at the lower extremity of the pipe 38 that, at a given moment, is situated in correspondence with the exit channel 24. The holding device 60 is activated when the detection mechanism indicates that the pipe 38 situated in correspondence with the entrance channel 22 is completely full of caps 40.

Operation of the accumulation device 28 provides for the following modalities:

loading;
operating at normal running speed;
operating as a buffer.

In the loading phase, starting from the hypothesis that the drum 28 is initially completely empty, the caps 40 arriving from the entrance channel 22 fill a first pipe 38. When the first pipe 38 is full of caps 40, the holding device 60 interrupts the feeding of caps 40 into the entrance channel 22. The drum 28 then rotates by one step bringing an empty pipe 38 into correspondence with the entrance channel 22. This cycle is repeated until a complete rotation of the drum 28 has been performed. At this point, the drum 28 is completely full of caps. Only when the drum 28 is completely full will a pipe 38 full of caps be located in correspondence with the exit channel 24. The caps present in the pipe 38 situated in correspondence with the exit channel 24 fall into the exit channel 24 and are fed in succession to the capping machine 14.

At this point the phase of operating at normal running speed begins. In this phase, the drum 28 is only commanded to rotate by one step when the pipe 38 situated in correspondence with the entrance channel 22 is completely full and the pipe 38 situated in correspondence with the exit channel 24 is completely empty. This makes it impossible that a cap entering or leaving remains jammed during rotation of the drum.

If feeding of caps 40 into the entrance channel 22 is interrupted, the device 18 enters into the buffer operating mode. In this case, the drum 28 is commanded to rotate by one step when the pipe 38 situated in correspondence with the exit channel 24 is completely empty, even if the pipe 38 situated in correspondence with the entrance channel 22 is not completely full.

Operation of the accumulation device according to the present invention 28 is not in any way connected to the pitch nor to the running speed of the capping machine 14. The advantage of this is that the accumulation device may be standardised and used for capping machines with different pitches.

In the device according to the present invention, the lack of some caps in any pipe does not cause operating problems since the empty spaces are recovered in the exit channel 24 between the accumulation device 28 and the capping machine 14. Lastly, in the device according to the invention each cap moves through a relatively short distance inside the accumulation device 28, corresponding to the length of the pipe 38. This reduces the risk of abrasion of the caps and the production of dust.

It is possible to situate on the periphery of the accumulation device, preferably in the loading and unloading zone, one or more cap washing and/or drying stations or sterilisation stations using for example UV rays.

This device may also be used to carry out the operations described above independently of its accumulation function.

Should it be desired to handle caps of different formats the device may be fitted with more than one series of pipes 38 located at different pitch circle diameters. The different sets of pipes 38 can have dedicated entrance channels 22 and exit channel 24 located in different angular positions one from another.

Figure 8:
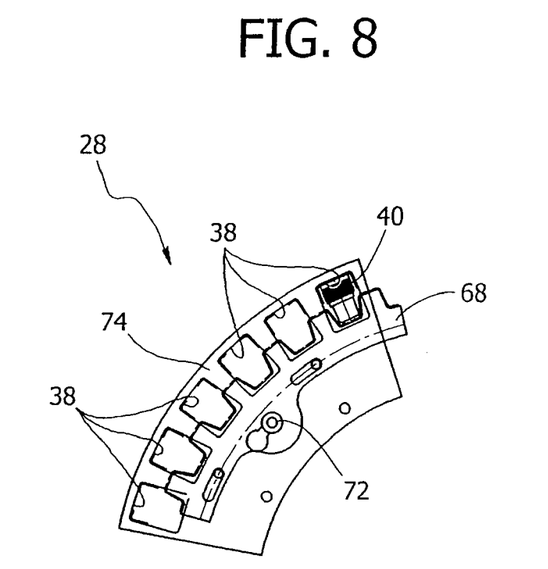
FIGS. 8 and 9 are plan views respectively from the standpoint of arrows VIII and IX in FIGS. 6 and 7.
Figure 9:
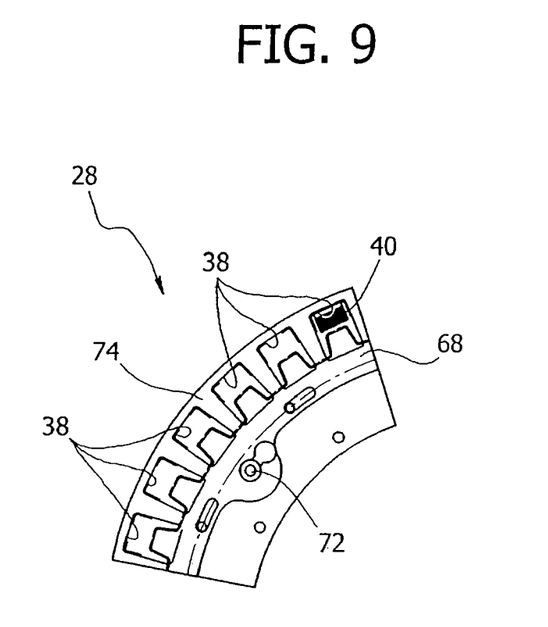

Should it be desired to handle caps of different formats on the same pitch circle diameter it is possible to fabricate the pipes 38 such that they are comprised of two facing halves that are mobile one with respect to the other. An example of this solution is illustrated in FIGS. 8 and 9, in which the inner walls of the pipes 38 are formed of an inner part 68 having a toothed external profile and angularly mobile with respect to an outer part 74 of the drum 28, in which the outer walls of the pipes 38 are formed. As is seen by comparing FIGS. 8 and 9, by rotating the inner part 68 with respect to the drum 28 it is possible to vary the dimensions of the pipes 38 in the radial direction, enabling caps 40 of markedly different heights to be handled.

Figure 6:
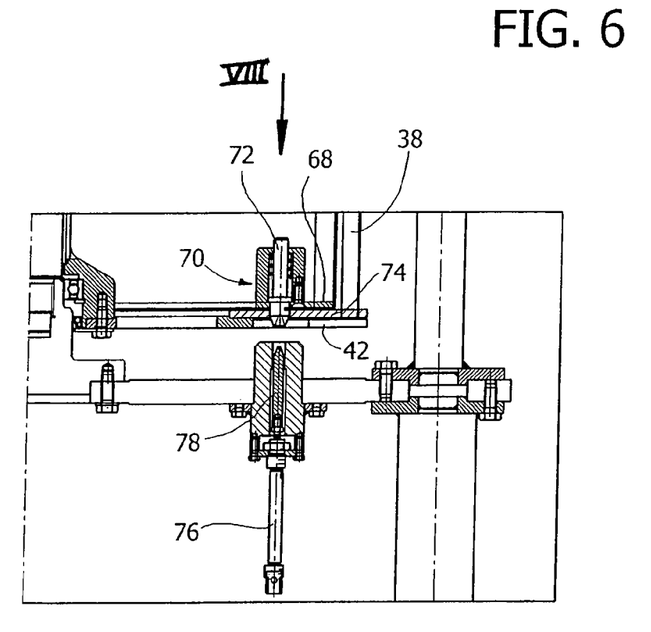
FIGS. 6 and 7 are enlarged details of the part indicated by arrow VI in FIG. 1 in two operative positions.
Figure 7:
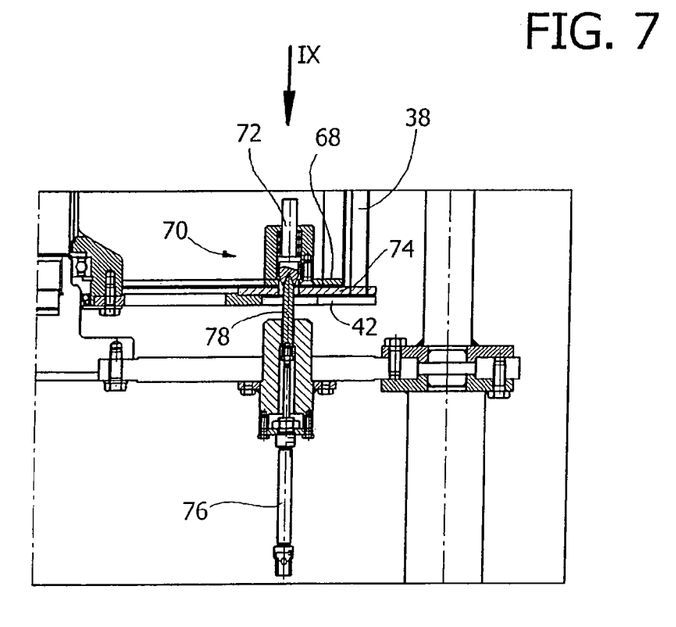

With reference to FIGS. 6 and 7, this format change operation may be made completely automatic by fitting the accumulation device 20 with a locking unit 70 located on the mobile plate 68. The locking unit 70 comprises a locking pin 72 that constrains the inner part 68 to the outer part 74. The locking pin 72 may be released in a specific angular position of the drum 28.

The pin 72 may be released for example through a stationary pneumatic actuator 76 that by means of a push rod 78 pushes the pin 72 into an unlocked position (FIG. 7).

By exploiting the rotation of the drum it is possible to bring the two parts 68, 74 out of phase one with respect to the other. After the rotation, removing the command signal from the actuator 76, the drum 28 lies in a new configuration with the two parts 68, 74 again integrally constrained one to the other.

Naturally, the principle of the invention remaining the same, construction details and embodiments may be widely varied with regard to what is described and illustrated here without thereby departing from the scope of the invention as is defined by the attached claims.

The invention claimed is:

1. A system for feeding bottle-tops to a bottle closing machine, comprising:
    an accumulation device comprising a drum rotating around a vertical axis and provided with a plurality of pipes uniformly distanced one from the next in a circumferential direction and each having an upper extremity and a lower extremity respectively for the entrance and exit of caps, wherein the drum comprises two parts angularly mobile one with respect to another that can selectively be locked in different relative positions corresponding to different formats of the caps;
    an entrance channel for feeding the caps to the accumulation device; and
    an exit channel through which the caps leave the accumulation device and which feeds the caps to the bottle closing machine.

2. The system according to claim 1, wherein the entrance channel and the exit channel communicate respectively with the upper extremity and with the lower extremity of two pipes that are relatively close to one another.

3. The system according to claim 2, wherein the exit channel is in communication with the lower extremity of a preceding pipe, immediately adjacent or close to one of the pipes whose upper extremity is in communication with the entrance channel, with reference to a direction of rotation of the drum.

4. The system according to claim 1, further comprising detection mechanisms adapted to determine a condition of at least one of fullness and emptiness of the pipes situated in correspondence with the entrance channel and the exit channel.

5. The system according to claim 4, further comprising a holding device associated with the entrance channel and positioned so as to interrupt entrance of the caps into the drum when one of the pipes situated in correspondence with the entrance channel is completely full.

6. The system according to claim 1, further comprising an automatic command to lock and unlock said two pads, wherein relative movement to change from one to another of the relative positions is obtained by exploiting rotation of the drum around its vertical axis.

7. A device for at least one of washing, drying, and sterilizing caps for containers, comprising:
    a drum rotating around a vertical axis and provided with a plurality of pipes distanced uniformly one from another in a circumferential direction and each having an upper extremity and a lower extremity respectively for entrance and exit of the caps, wherein the drum comprises two parts angularly mobile one with respect to another that can selectively be locked in different relative positions corresponding to different formats of the caps.

8. The device of claim 7, further comprising an automatic command to lock and unlock said two pads, wherein relative movement to change from one to another of the relative positions is obtained by exploiting rotation of the drum around its vertical axis.

* * * * *

UNITED STATES PATENT AND TRADEMARK OFFICE
CERTIFICATE OF CORRECTION

| | |
|---|---|
| PATENT NO. | : 7,353,643 B2 |
| APPLICATION NO. | : 11/530731 |
| DATED | : April 8, 2008 |
| INVENTOR(S) | : Cirio |

It is certified that error appears in the above-identified patent and that said Letters Patent is hereby corrected as shown below:

On the First Page, Foreign Application Priority Data (30):

Please delete "TO2005A0904" and insert --TO2005A000904--;

In the Claims:

Column 6, Claim 6, Line 28, please delete "pads" and insert --parts--;

Column 6, Claim 8, Line 45, please delete "pads" and insert --parts--.

Signed and Sealed this

Twenty-first Day of October, 2008

JON W. DUDAS
*Director of the United States Patent and Trademark Office*